United States Patent
Ford et al.

(10) Patent No.: US 6,561,538 B2
(45) Date of Patent: May 13, 2003

(54) ANNULAR AIR BAG AND DRIVER SIDE AIR BAG MODULE

(75) Inventors: Brian C. Ford, Mt. Clemens, MI (US); Lawrence R. Langbeen, Attica, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/871,037

(22) Filed: May 31, 2001

(65) Prior Publication Data

US 2002/0130493 A1 Sep. 19, 2002

Related U.S. Application Data

(60) Provisional application No. 60/276,133, filed on Mar. 16, 2001.

(51) Int. Cl.$^7$ ............................................. B60R 21/16
(52) U.S. Cl. ............................... 280/728.2; 280/730.1; 280/731
(58) Field of Search ................. 280/728.2, 728.3, 280/731, 730.1, 743.1, 743.2

(56) References Cited

U.S. PATENT DOCUMENTS

| | | | | |
|---|---|---|---|---|
| 3,618,979 A | * | 11/1971 | Gulette | 280/731 |
| 3,819,203 A | * | 6/1974 | Radke et al. | 280/731 |
| 3,831,973 A | * | 8/1974 | Meacham | 280/731 |
| 3,879,056 A | * | 4/1975 | Kawashima et al. | 280/743.2 |
| 4,828,286 A | * | 5/1989 | Fohl | 280/728.2 |
| 4,934,734 A | * | 6/1990 | Takada | 280/731 |
| 5,125,682 A | * | 6/1992 | Hensler et al. | 280/730.1 |
| 5,253,892 A | * | 10/1993 | Satoh | 280/731 |
| 5,439,247 A | | 8/1995 | Kolb | |
| 5,505,483 A | | 4/1996 | Taguchi et al. | 280/728.2 |
| 5,615,910 A | * | 4/1997 | Margetak et al. | 280/728.2 |
| 5,848,805 A | * | 12/1998 | Sogi et al. | 280/743.2 |
| 5,927,754 A | * | 7/1999 | Patzelt et al. | 280/739 |
| 6,042,147 A | * | 3/2000 | Nishijima et al. | 280/731 |

FOREIGN PATENT DOCUMENTS

| | | | |
|---|---|---|---|
| DE | 19749914 A1 | 5/1999 | |
| DE | 20010726 U1 | 10/2000 | |
| EP | 1164060 A2 | 6/2001 | |
| GB | 1 362 672 | 7/1971 | |
| GB | 2268128 A | * 1/1994 | B60R/21/16 |
| GB | 2 268 168 | 1/1994 | |
| JP | 63301144 | 12/1988 | |
| JP | 02037060 A | * 2/1990 | B60R/21/18 |
| JP | 03292237 A | * 12/1991 | B60R/21/16 |
| JP | WO 9734783 | * 9/1997 | B60R/21/20 |

\* cited by examiner

*Primary Examiner*—Brian L. Johnson
*Assistant Examiner*—Kelly E. Campbell
(74) *Attorney, Agent, or Firm*—Markell Seitzman

(57) ABSTRACT

An air bag module comprising an air bag, the air bag including: a face panel having a first central opening therein; a rear panel having a second central opening therein, that portion of the rear panel about the second central opening forming a neck portion; a tubular insert having an open end secured to the face panel about the first central opening, the tubular insert including a closed end opposite the open end, the tubular insert extending into the air bag.

22 Claims, 9 Drawing Sheets

ANNULAR AIR BAG AND DRIVER SIDE AIR BAG MODULE

The present invention is related to Provisional Patent Application Ser. No. 60/276,133 filed Mar. 16, 2001.

BACKGROUND AND SUMMARY OF THE INVENTION

The invention generally relates to an air bag, which in a broad sense is of annular or toroidal shape, which includes a means for filling its generally hollow center. The present invention also relates to air bag modules that incorporate the above air bag.

A typical driver side air bag module comprises a housing, an inflator, and an air bag and a cover. The housing is mounted at or near the hub or armature of the steering wheel. The inflator and air bag are located within the housing and the cover (and housing) protects the air bag. As the air bag inflates, the cover is separated permitting the inflating air bag to expand toward the occupant. There is a benefit to placing various informational related devices on or near the center of the cover as this region is easy to see and easy to reach by the occupant. As can be appreciated, because the cover is a sacrificial part of the module it is impractical to place permanent (and expensive) buttons, displays such as a GPS display, switches and the like on the cover. In addition, placing a hard display or switch on the cover may cause injury to the occupant in the event of a collision.

Another characteristic of the prior art construction is that on deployment, a relatively large, folded portion of the expanding air bag is initially thrust toward the occupant, which may increase the level of forceful interaction between the occupant and the expanding air bag. To restrict this forward motion of the air bag, many prior art systems have resorted to the use of tethers to control or limit the trajectory of the expanding air bag.

If a toroidal or annular air bag is used, this air bag would include a hollow center. An effective air bag would, however, incorporate a mechanism to fill the typically hollow center of this type of air bag. The present invention provides a simple, cost-effective, efficient solution.

It is an object of the present invention to provide an improved, generally toroidal or annular shaped air bag and to use same within a cooperating air bag module.

It is a further object of the present invention to provide an air bag module that can deploy about a fixedly positioned center or control module.

An advantage of using a fixed center module is that it can be used to support control or communication mechanisms and devices such as a horn switch, radio dials, cruise control buttons and even more complicated and expensive visual displays for a navigation system, including GPS satellite receiver display. These additional mechanisms and devices will be unaffected by the deployment of the air bag, which deploys about the center module. Additionally, after an accident, the air bag and cover will typically need to be replaced, however, there may be no need to repair or replace the center module.

Another object of the invention is to provide a cushion that initially fills radially before allowing a center core to collapse, filling the center portion of the cushion. In addition, the air bag cushion is encouraged to initially fill radially about the center control module due in part to the fixed center control module.

An added object of the present invention is to provide a driver side air bag having a slit or opening in a face panel thereof and to include within the bag a means for urging the slit toward a closed configuration as the air bag inflates, thereby inhibiting access to the center or hollow part of a generally annular air bag. It is also an object of the present invention to configure a center tubular portion of the air bag such that shortened sides of this tubular portion act as a tether to restrict the deployment of the air bag towards the occupant. The longer sides of the tubular portion provide additional fabric to fill in the center void (of the tubular portion) for occupant protection.

Accordingly the invention comprises: an air bag as well as an air bag module using the air bag wherein the air bag includes: a circular face panel having one of a slit or thin first opening generally at or near its center; a rear panel of substantially the same shape as the first panel and having a second opening, that is typically circular, the diameter of the second opening being sufficient to receive an inflator. The air bag further includes a tubular member element or portion having an open top and a closed bottom. The tubular member, element, or portion is secured to the face panel and located between the face and rear panels. The open top of the tubular member is secured about the first opening, such that access to the interior of the tubular member can be obtained through the first opening. As will be seen the walls and a bottom or closed end of the tubular member form a generally tubular cavity. A control module is first placed within the cavity, through the slit, and then fixedly secured to a steering wheel or the like with the face panel and in particular the first opening positioned radially about the control module. Upon inflation, the air bag deploys generally radially about the control module. As the air bag continues to inflate, pressure within the air bag acts on the top of the tubular member, proximate the first opening, tending to close the first opening (the slit) thereby preventing access to the fixed control modules through the generally tubular cavity.

Many other objects and purposes of the invention will be clear from the following detailed description of the drawings.

BRIEF DESCRIPTION OF THE DRAWINGS

In the drawings:

FIG. 12a shows an inflated air bag with the housing of FIG. 12 and is taken along section line 12a–12a of FIG. 3a.

DETAILED DESCRIPTION OF THE DRAWINGS

Figures 1, 1A:
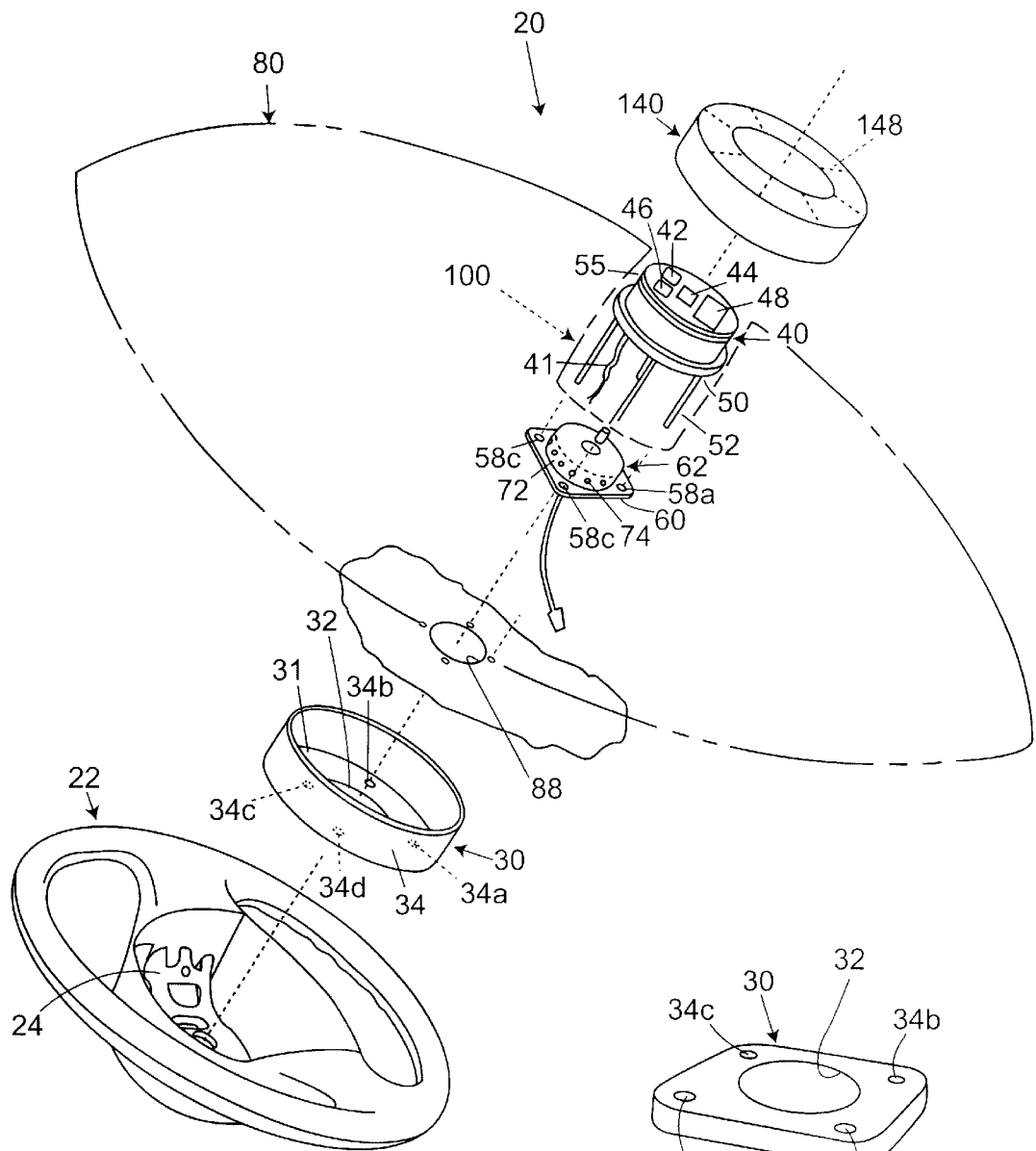
FIG. 1 is an assembly view showing a steering wheel and an air bag module that incorporates the present invention.
FIG. 1a shows an alternate plate-like housing.
Figure 18:
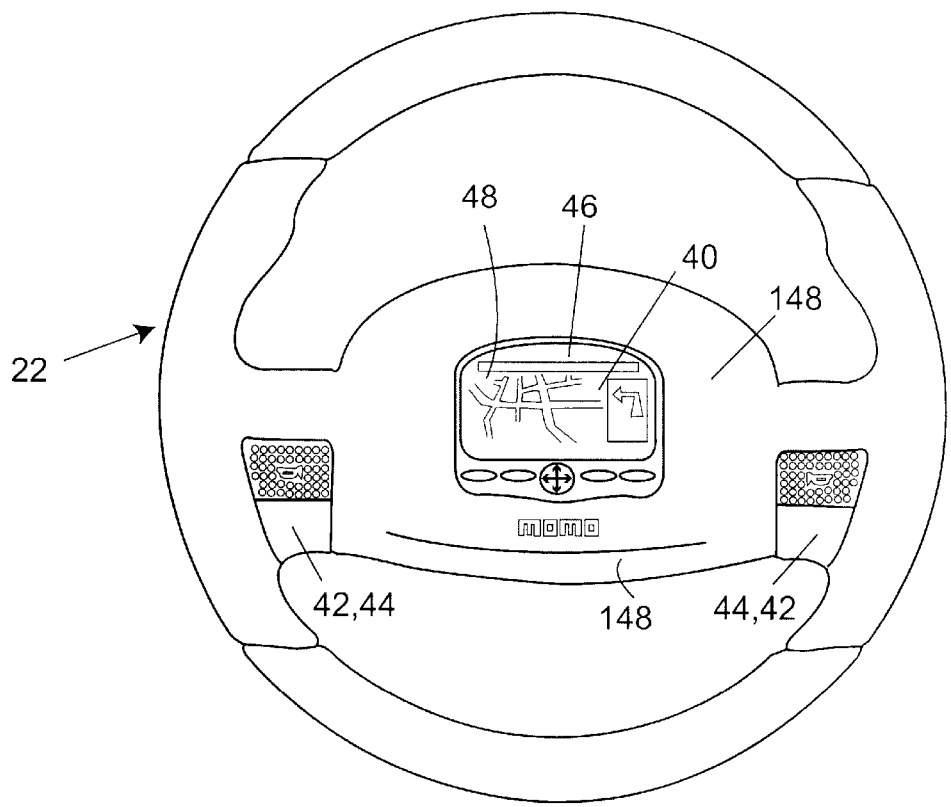
FIG. 18 is a top plan view of a driver air bag module installed in a steering wheel.

Reference is made to FIGS. 1–4b, which illustrate a driver side air bag module 20 and its various component parts. The module is adapted to be secured to a steering wheel 22 and more particularly to the hub, armature or center mechanism 24 of the steering wheel. The module can be secured or attached to the steering wheel in any of many acceptable ways. For example, the module can be snapped into place or held in place directly or indirectly using threaded fasteners. Depending on the specific configuration, the module 20 may comprise a discrete, often cup-shaped housing 30 having a bottom 31 with central opening 32 and sides 34 to contain the folded air bag, or the housing per se can be eliminated, in which case the module can use the hollow cavity of the steering wheel hub area as a de facto housing to protect the folded air bag. The housing 30 can be plate-like (see FIG. 1a) and flat. The shape of the housing can be varied, circular, triangular, or trapezoidal as needed. In FIG. 1a, the housing is formed by a ring or generally flat plate (also referred to by numeral 30) having a central opening 32 and a plurality of stud-receiving openings 34a–34d (which are also shown in FIG. 1). The module additionally includes a center (control) module 40 (also shown in FIG. 1). As shown, this center module 40 is circular but can be varied shapes and sizes, for example see FIG. 18. The center module 40 may house signal conditioning electronics within a housing portion thereof. An upper surface (which may be flat or contoured) of the module 40 can support one or more informational devices such as displays or mechanisms such as a horn switch 42, radio buttons 44, a navigation system 46 and its associated display 48, cruise control buttons (not shown), etc. Electric wires 41 can carry signals to and from the control module 40. The module 20 further includes a cover 140 and an inflator 62, which inflates the air bag 80 (which is only partially shown in FIG. 1). As mentioned, the specific shape of the housing, center module and cover will vary with each application. Generally, the sides of the housing and cover will cooperate with the center module 40 to create a covered, annular trough, which extends about the center module 40 and in which the folded or compressed air bag is located. This trough may be circular, triangular, oval, etc. as dictated by performance and styling considerations and, of course, by the shape of the housing, cover and control module.

Reference is again briefly made to the features of the center module 40. As can be seen, this control module 40 includes a plurality of threaded mounting studs 52, which extend from a bottom 50 of the center module 40. As will be further described, these studs extend through openings 58a–58d in the flange 60 of an inflator 62, as well as through various openings 84a–84d in the neck portion 67 of the air bag 80, as well as through a tubular portion (member, element) 100 of the air bag 80. The inflator includes a plurality of exit ports 74 through which inflation gas is communicated to the air bag. The mounting studs 52 can also extend through openings in the hub of the steering wheel as one means of fastening the module to the steering wheel and then fixed in place by fasteners such as nuts 53 (not shown in FIG. 1 but see FIG. 13).

Figure 12:
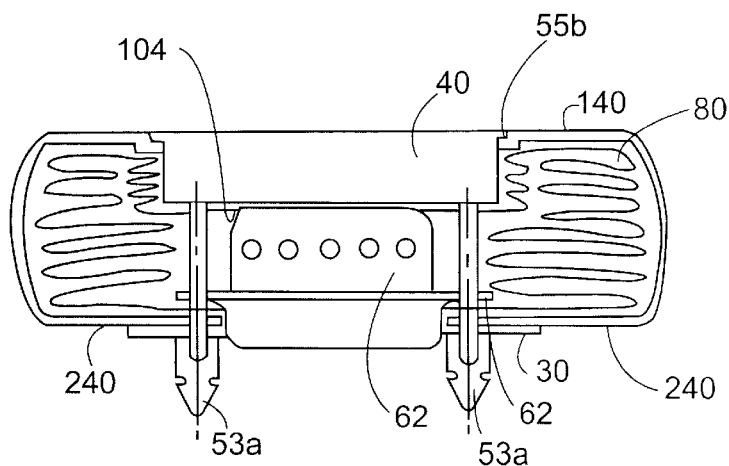
FIG. 12 is a cross-sectional view showing one embodiment of an assembled module with a flat housing.

Reference is briefly made to FIG. 12, which shows an alternate construction of the invention in which each fastener 52 of the center control module 40 is secured to a snap-fit connector 53a, which also acts as a nut holding the various parts of the module 20 together. The tapered tip of fastener 53a also permits the module to be easily inserted within or snapped into the steering wheel when using a cooperating snap-fit fastening or receiving part of known construction. FIG. 12 also shows the use of the flat-plate housing 30. Also, in this configuration, the cover 140 includes opposing side tabs 240, which envelop the underside of the housing 30 and which are sandwiched between the inflator flange 60 and adjacent portions of the housing 30. The neck 67 of the air bag is also sandwiched between the flange and the housing.

Figure 13:
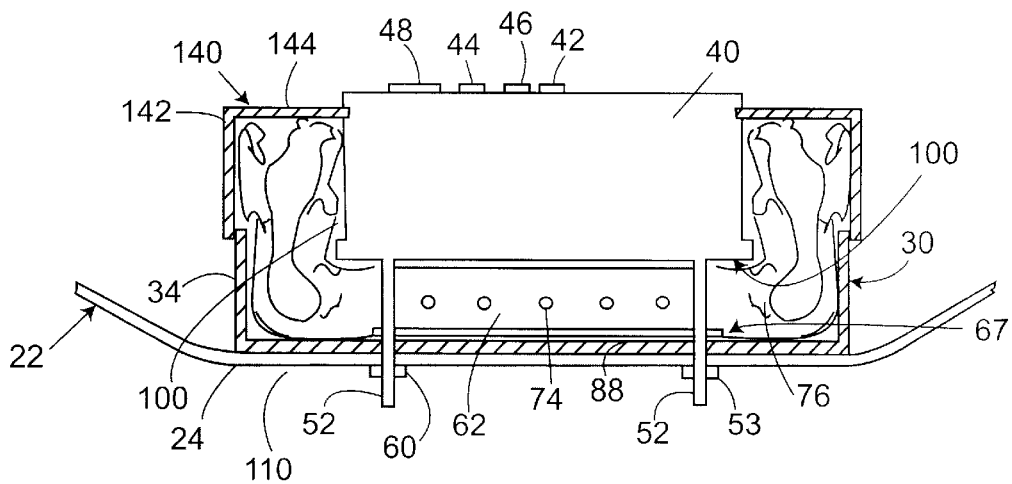
FIG. 13 is another cross-sectional view of an assembled module using a cup-shaped housing.

FIG. 13 is a cross-sectional view of the module shown in FIG. 1 with the circular, walled housing 30. The neck portion 67 of the bag is also clamped between the housing bottom 31 and an inflator flange 60.

As will be seen later, these studs also extend through other openings in a bottom portion of a fabric tube 100, which is part of the air bag. This bottom portion 104 is clamped between the bottom of the control module 40 and a cooperating part of the module such as the inflator, ring, housing, etc.

Figure 2:
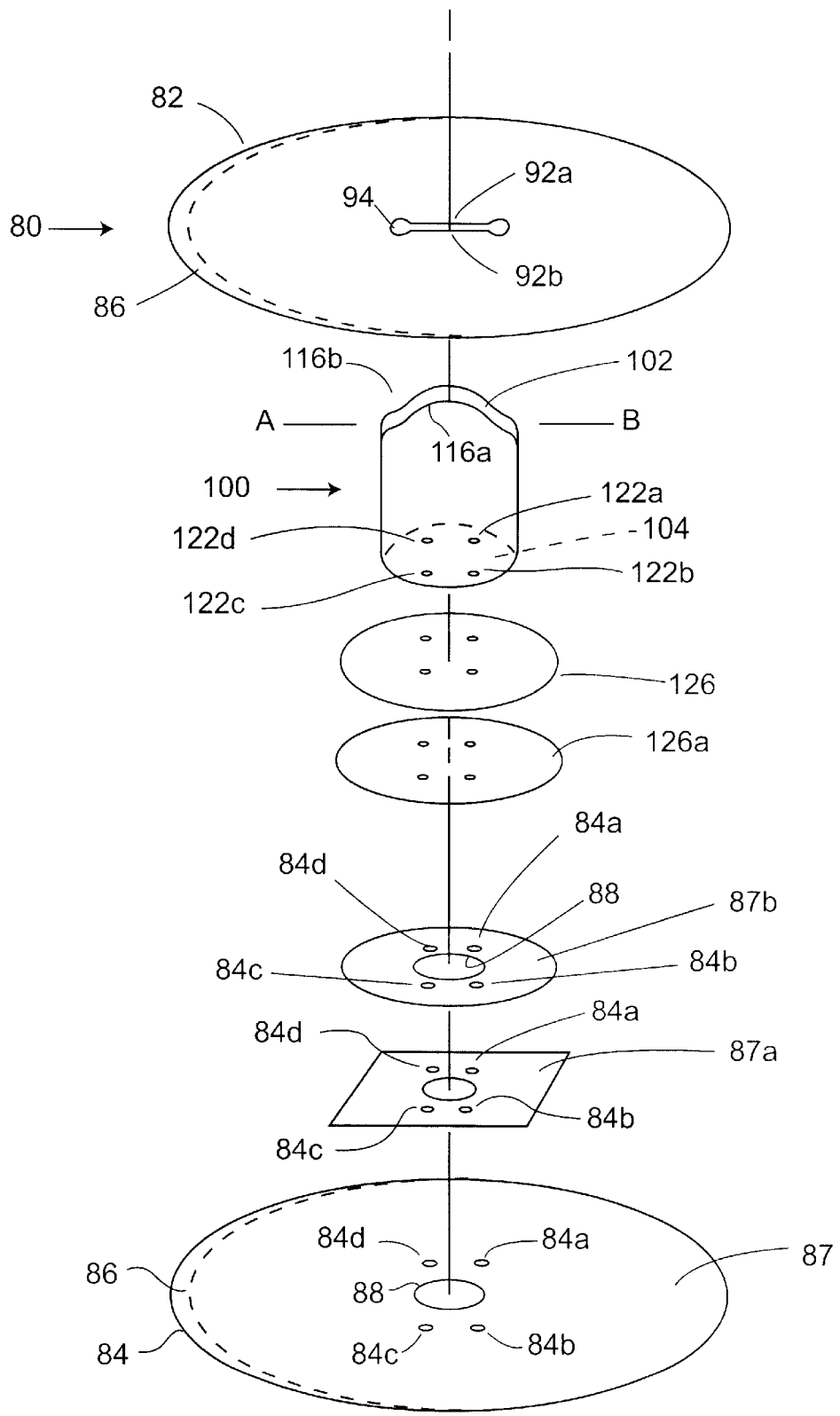
FIG. 2 is an assembly view showing many of the major parts of an air bag of the present invention.
Figure 3:
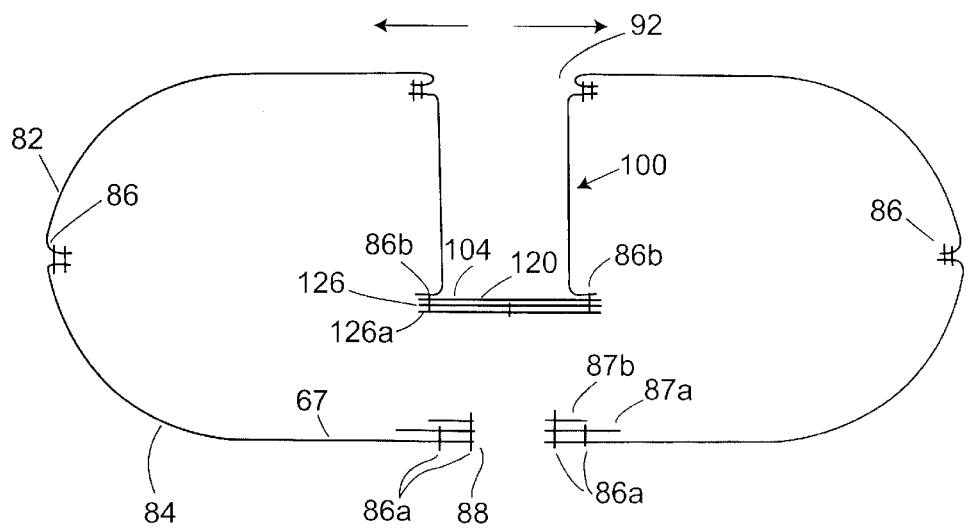
FIG. 3 diagrammatically represents a cross-sectional view of an air bag with a tubular member within the center of the air bag.
Figure 3A:
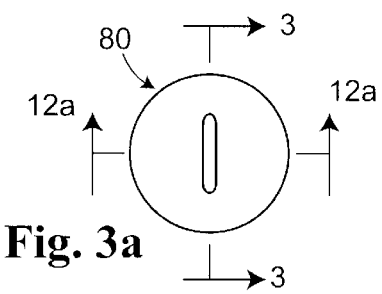
FIG. 3a diagrammatically represents a top view of an inflated air bag.

Reference is again made to FIGS. 2, 3, 4a and 4b, which illustrate the major components of the air bag 80. The air bag comprises a face panel 82 (which in the illustrated embodiment is circular) and a similarly shaped rear panel 84 that are sewn together along a peripheral seam generally shown as 86. Panels that are of other shapes including oval or rectangular are within the scope of the present invention. The panels will typically be made from a woven nylon fiber. The rear panel 84, at its neck 67, includes a center opening 88, which is located interior to the mounting openings 84a–84d (also in the neck 67). As shown more clearly in FIG. 3 (as well as in FIG. 2), the neck area can optionally be reinforced by a number of small panels 87a and 87b, which may be any convenient shape including oval, round or rectangular. One or both of these panels 87a and 87b also act as a heat shield, shielding the panel 84 from the heated gas provided by the inflator 62. Each panel 87a and 87b also includes a center opening 88 as well as fastener openings, which are also identified by numerals 84a–d. The panels 84, 87a and 87b are sewn together (see seams 86a) with the respective center openings 88 and the respective fastener openings in alignment as shown in FIG. 3. After the air bag is constructed, the inflator 62 is, partially or completely, placed within the air bag through opening or openings 88 (which is also meant to include the composite of the aligned openings 88) so that the exit ports are inside the bag.

Figure 4A:
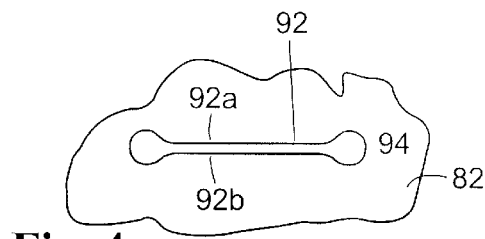
FIGS. 4a, 4b and 4c show alternate configurations of a slit or opening used on a face panel of the air bag.
Figure 4B:
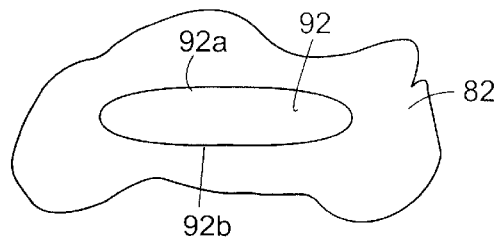
Figure 4C:
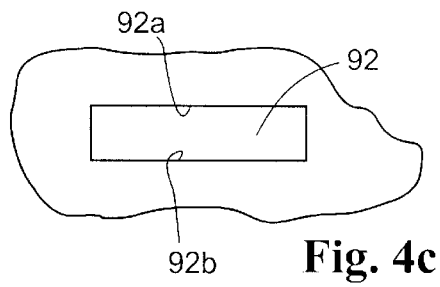

As mentioned above, the face panel 82 includes a slit 92, which locally splits the face panel into facing sides or elements 92a and 92b. The ends of the slit 92 can include stress-reducing features if needed such as small, circular cutouts 94 (also see FIG. 4a). The length of the slit 92 is discussed below. The sides, or elements 92a and 92b are preferably separated only by the thickness of the instrument used to slit the face panel. In FIG. 4a the slit has a determinable though narrow-width and in FIG. 4b the slit is oval shaped with its sides 92a and 92b spaced apart a greater distance. For example, with regard to the slit of FIG. 4a, the spacing between the sides 92a and 92b is about 1 mm and a typical length of the slit is in the range of 120 mm to 180 mm. FIG. 4c shows the use of a rectangular slot of 92. As will be seen below the slit 92, of the flexible face panel 82, will be pulled apart to permit the center control module 40 to be inserted into a center tubular member (portion or element) 100 of the air bag. In general, the length of the slit or opening 92 should be of sufficient size so that the effective opening, achieved when the sides of the slit 92 are separated, is large enough to permit the control module 40 to be inserted therein.

Figure 5A:
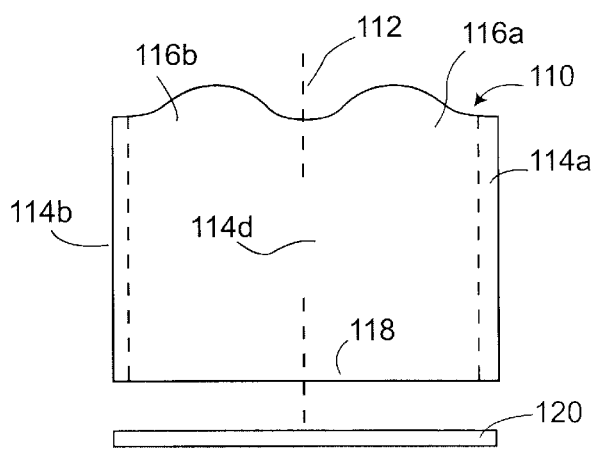
FIGS. 5a–5b show the detail of one embodiment of a tubular center member or portion of an air bag.
Figure 5B:
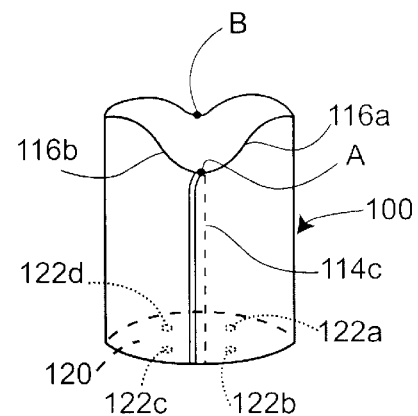
Figure 5C:
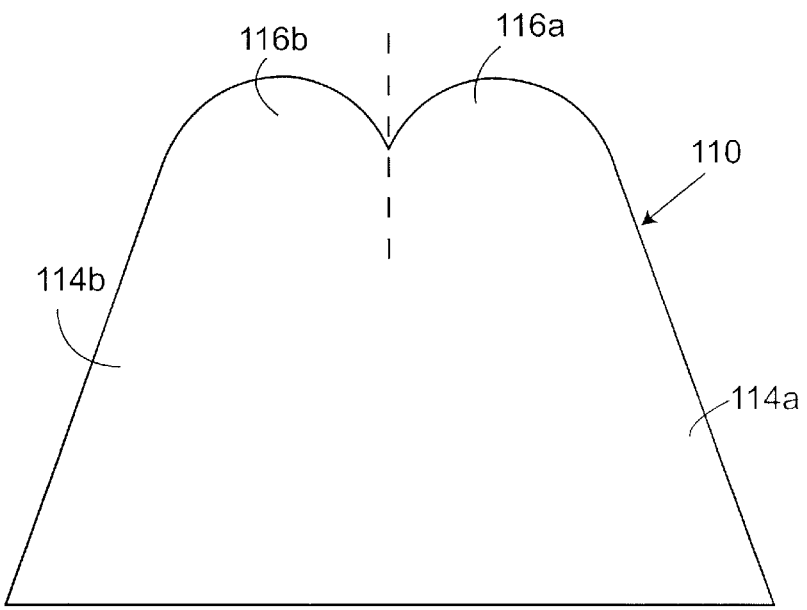
FIG. 5c shows an alternate embodiment of the tubular center portion shown in FIGS. 5a and 5b.

As mentioned above, the tubular portion 100 is secured about the slit 92. The generally tubular portion 100, as shown in FIG. 2, is formed with an opening end 102 and a closed end 104 (see FIGS. 2, 5b and 6) and has a cylindrical body. The tubular portion 100 can be made from one or more pieces or panels of material or can be formed as a one-piece woven sock-like structure (with integrated bottom and sides and an open mouth or top). FIG. 2 shows one such center portion 100 positioned apart from the face panel 82. FIGS. 5a–5c show the construction of the center portion 100 in greater detail. An alternate embodiment of the portion 100 is shown in FIG. 5c.

In FIG. 5a the center portion 100 is formed using a flexible, woven core panel 110, which is symmetrical about a centerline 112 and includes sides 114a, b (which are parallel but which can be angled, see FIG. 5c), a top 116 having two arched sections 116a and 116b and a straight bottom 118. Positioned below the core panel 110 of FIG. 5a is an end panel 120, which can also be formed of a woven, flexible material, and in this embodiment the core panel is circular. In FIG. 5b, the core panel 110 has been folded or rolled over the centerline and the sides 114a,b sewn together along a sewn seam 114c. Thereafter the end panel 120 is sewn to the bottom or end 118 of the core panel, closing this end, to form the tubular center portion 100 (also shown in FIG. 2). The end panel 120 also includes a plurality of openings 122a–d. Each of the panels forming the tubular portion 100 is formed of a flexible fabric, which as mentioned can be woven and can be coated or uncoated depending on the need to control the air permeability of the panels and to control the heat shielding effects. As can be appreciated, the flexible material permits the central portion 100 to be pulled, bent and twisted and in a sense molded to the shape needed. In its assembled configuration, the bottom 120 or closed end 104 of the center portion 100 will be positioned adjacent an inflator 60. Optionally, one or more heat shields 126, 126a formed by thick and/or coated, flexible fabric panels can be sewn to (see seam 86b) or incorporated as the end panel 120. In this manner heated inflation gas does not directly impinge on the bottom panel 120. The heat shield 126, if used, also includes another set of openings 124a–d, which are aligned to the set of openings in the end panel or bottom 120.

Having formed a tubular center portion 100, it is now connected to the face panel 82. More particularly, the top arched sections are sewn peripherally about and slit with section 116a sewn to side 92a of the slit and the other top arched section 116b sewn to side 92b of the slit. As can be appreciated, the length of the slit 92 is the same as the distance from point A to point B (see FIG. 5b) measured along a curved arched section 116a (or 116b).

Figure 6:
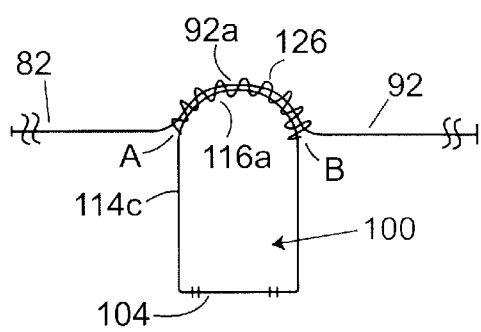
FIG. 6 is a partial cross-sectional view showing a tubular center portion of FIG. 5b sewn to part of a face panel of the air bag.

Reference is briefly made to FIG. 6, which shows a cross-sectional view of the face panel 82 with one side 92a of the slit sewn to one of the arched sections such as 116a, the seam being designated by numeral 126.

As mentioned, the bottom of the tubular portion 100 will be fixed in place as it is secured by the inflator 62. Consequently, FIG. 6 can also be envisioned as showing the relative positions of the tubular center portion 100 and the face panel 82 when the air bag is inflated. As can be seen, portions of the face panel near points A and B of the tubular center portion 100 will be maintained closer to the bottom 104 (i.e. the inflator) of the center portion 100, and also act as a tether as this construction limits forward displacement (that is toward the occupant) of the face panel 82. As can be appreciated, the shortest dimension of the center portion 100 is along the sewn seam 114c (as well as region 114d that is generally opposite the seam 114c). Since the seam 114c, in this construction, is located at the tether, during inflation the sewn seam will be tensioned. Some of the following embodiments reposition the location of the sewn seam 114c, so that it is not at the shortest part of the core panel and therefore will not be subjected to as much tension.

Figure 7:
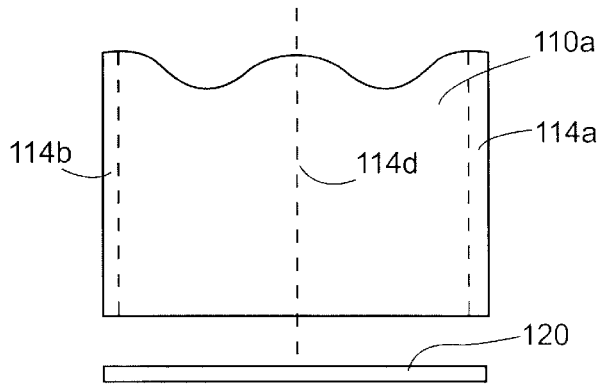
FIGS. 7–9 show an alternate construction of the air bag.
Figure 8:
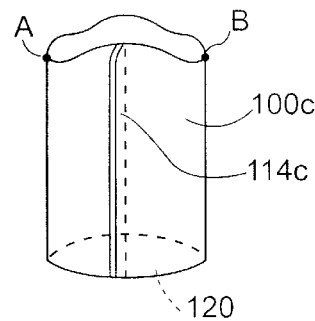
Figure 9:
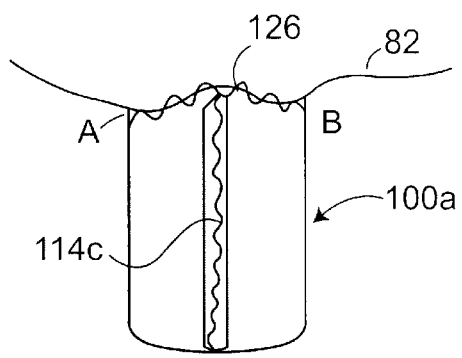

Reference is briefly made to FIGS. 7–9, which show another embodiment of a tubular center portion 100a. In this embodiment the core panel 110a includes arched portions 116c and 116d, which are concave in shape (as opposed to the generally convex shape of the arched sections 116a and 116b). After the sides 114a and 114b are sewn together, it can be seen that the shortest portions (those which act as a tether) of this center portion 110a have been moved away from the sewn seam 114c; consequently when the air bag is inflated and the tubular portion 100a is stressed, the maximum stresses will no longer lie along the sewn seam 114c. FIG. 9 shows this alternative center tubular portion 110a sewn to the face panel 82 and also along a seam 126.

Figure 10:
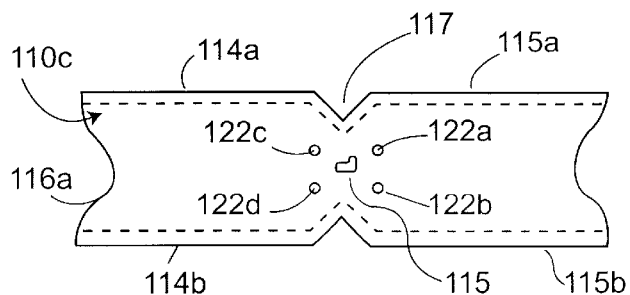
FIGS. 10 and 11 show another embodiment of the invention.
Figure 11:
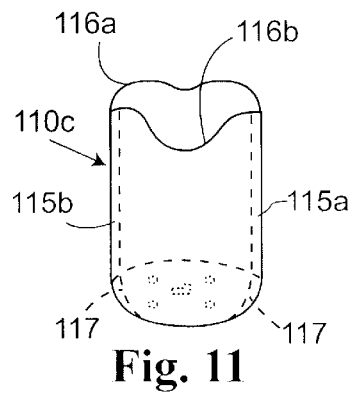

Reference is briefly made to FIGS. 10 and 11, which show a further embodiment of a tubular center portion 100c. In this embodiment, the portion 10c is made of one piece of fabric as opposed to two panels. An assembled one-piece core panel 110c forms the bottom and sides of the tubular portion. Core panel 110c will also include the openings 122a–d previously found in the bottom panel 120. The core panel 110c is folded over centerline 112 and side portion 114a is sewn to portion 115a and 114b sewn to 115b. Panel 110c also includes additional openings or slits 117 near the intersection of each side and centerline 112, which facilitates sewing of the panels 10c. The ends 116a and 116b of panel 110c are arched and, as with the embodiment of FIG. 2, are sewn to opposite sides of the slit 92. The benefits of this construction are as follows: the heat shields (if used) can be positioned upon the core panel 110c while the core panel is still flat and the heat shields tack sewed very easily. Both of the core panel and the heat shields can include odd-shaped openings such as 115. When these corresponding openings 115 are aligned, the heat shield is properly positioned both linearly and angularly prior to sewing. Thereafter the mounting openings or holes 122a–d can be punched therethrough in one operation insuring alignment of these holes and, as can be appreciated, the core panel sides can be sewn quite easily giving the tubular portion its shape. While not shown, the tubular member, portion or element 100 can be formed as a one-piece woven sock with an integral bottom, sides and open top. The fastener holes can be formed during weaving or subsequently cut or burned out.

Figure 14:
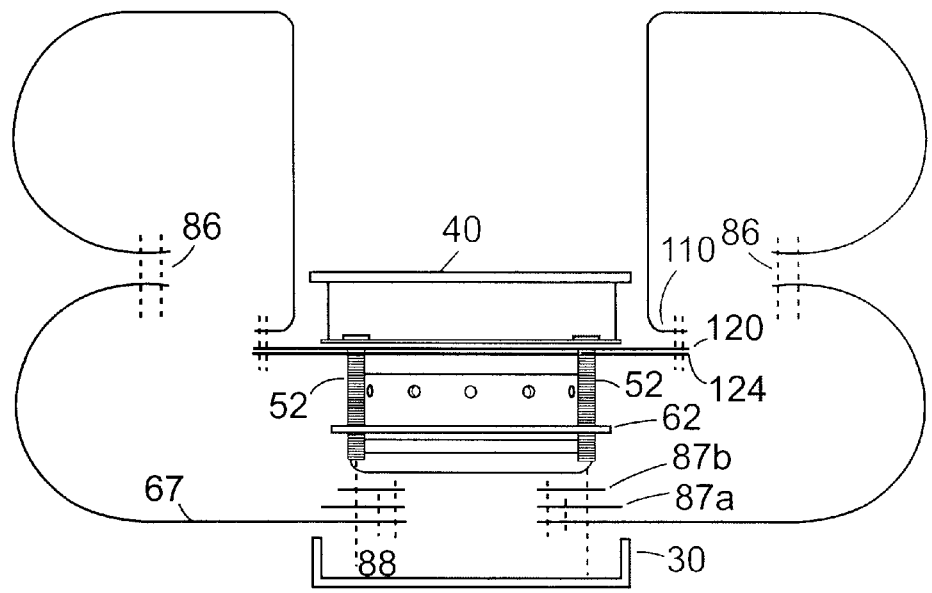
FIG. 14 is similar to FIG. 3 and additionally includes a control module positioned within a tubular element or portion.

Reference is made to FIG. 14, which is similar to FIG. 3. The tubular central element portion 100 is located between the sewn-together face and the rear panels. As can be appreciated, the configuration of the air bag would be similar with the other tubular portions 110b or 110c. Thereafter, the sides of the slit 92 are pulled open and the center control module 40 is moved to the bottom or the portion 104 or to the end panel 120, and each of the fasteners 52 is received through one of the fastener openings 122a–d (in the bottom 104 and heat shields, if used). Thereafter the inflator 62 is placed into the air bag through the opening 88 in the rear panel as also shown in FIG. 14. The fasteners 52 also extend through one of the openings 58a–d in the flange 60 of the inflator 62. As can be seen, the top of the inflator 62 sandwiches the bottom 104 (of the tubular member 100) against the bottom of the control module 40.

Thereafter, each stud 52 is received in one of the openings 64a–64d about the neck 67 of the rear panel 84. As can be seen, the neck of the rear panel lies adjacent and below the bottom of the inflator. Finally the housing (whether cup-shaped or flat) 30 is positioned on the studs sandwiching the neck portion of the rear panel against the flange of the inflator. As previously mentioned the various parts of the module 20 can be secured in place by respective threaded nuts 53 (or fasteners 53a) to achieve the configuration as shown in FIG. 12 or 13. The same or different nuts or fasteners can be used to secure the housing, inflator and control module to the steering wheel 22 as shown in FIG. 1.

Figure 15:
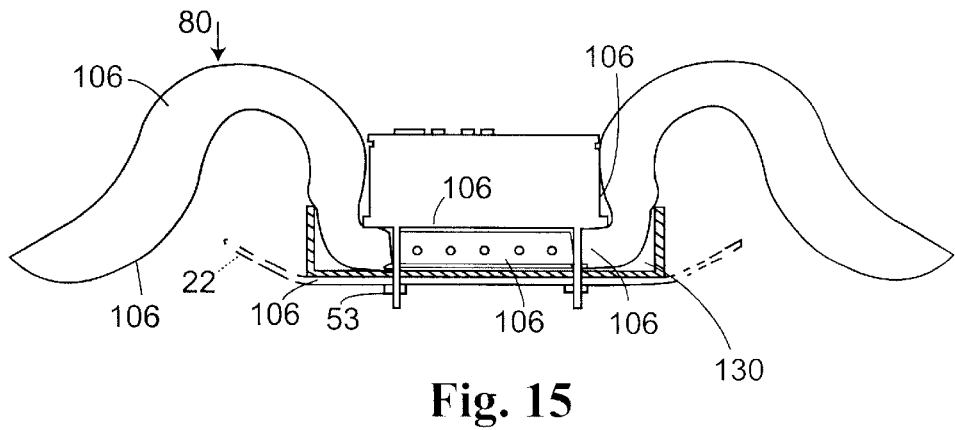
FIG. 15 is a cross-sectional view of an air bag module with an unfolded air bag extending radially outward.
Figure 12A:
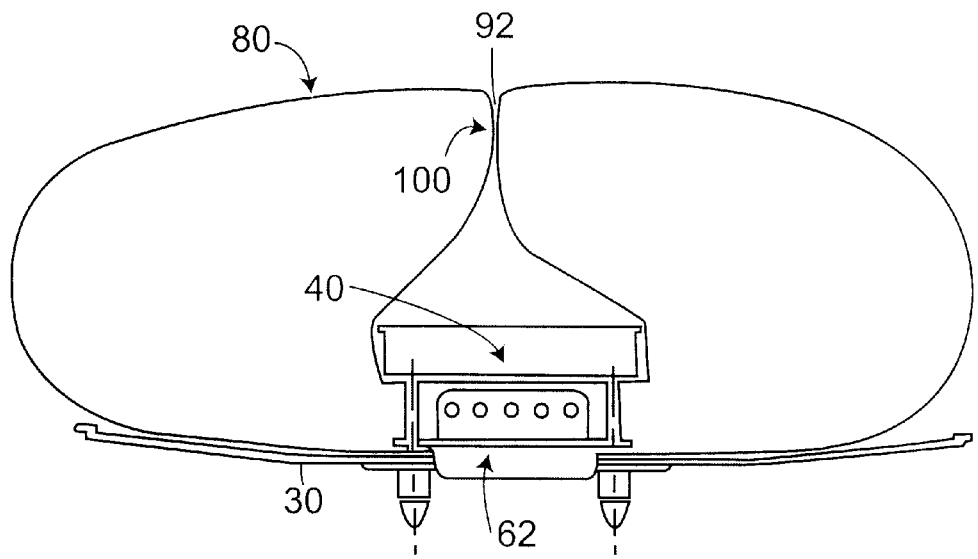

Prior to folding the air bag 80, face panel 82 is pushed downward so that the slit 92 is located about the side of the center control module. Thereafter, prior to folding, the air bag 80 can be positioned to extend outwardly over the sides of the housing 30 as shown in FIG. 15. Subsequently, the air bag 80 is folded to reside within the annular space 130 between the interior surfaces of the housing, the inflator and center control module 40, and the cover 140 secured about the center module 40 and to the housing 30. Alternatively, the cover 140 can first be attached to the module 40 and the air bag folded into the space between the module 40 and the cover. Thereafter, the housing 30 is secured in place about the folded air bag and held in place by to the fasteners 53 or 53a.

Figure 19:
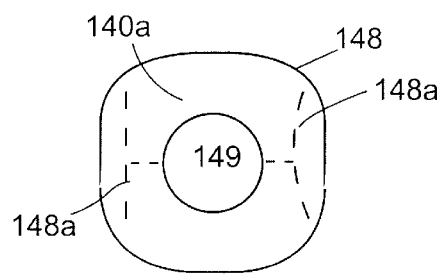
FIG. 19 shows an alternate cover.
Figure 16:
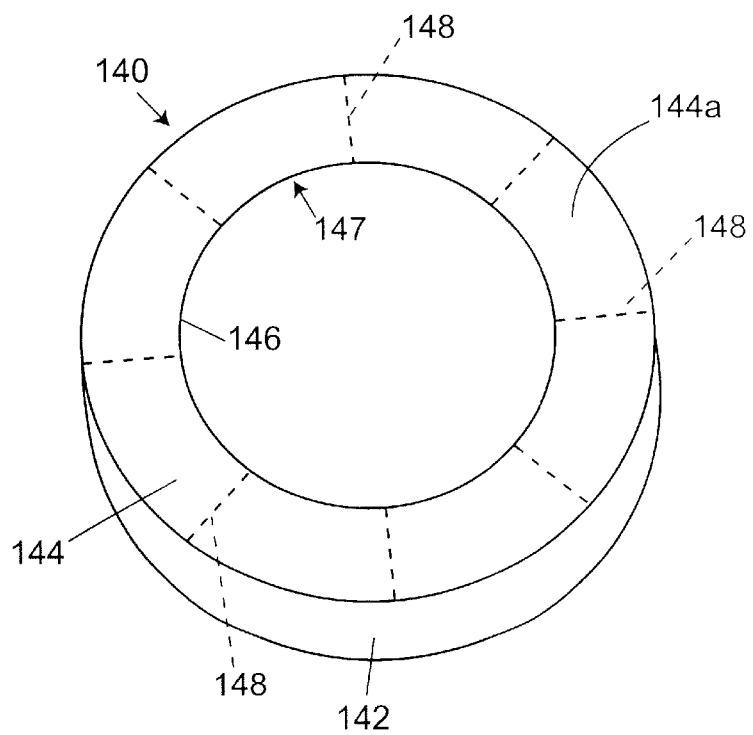
FIG. 16 is a top view of an exemplary cover.

Reference is again made to FIG. 1 as well as to FIG. 13, which show further details of the present invention. As can be seen, the center module 40 includes a peripheral groove 55, which is used to secure a center opening 146 of a cover. For example, after the air bag is folded, it is covered by a cover 140. (A top view of the cover is shown in FIG. 16.) In one embodiment, the cover 140 is annular shaped and comprises a cylindrical outer wall 142 with a flat annular top 144 having a center hole 146. The diameter of hole 146 is smaller than the diameter of groove 55 so that the lip 147 about the opening 146 can slip within the groove and be secured thereby. The cover 140 additionally includes a plurality of generally radial tear seams 148. Alternatively, for example, the cover 140a (see FIG. 19) may include a center opening 146 with first and second radially directed tear seams 148 extending from about the 90 and 270-degree points (or 0 and 180 degree) about the center opening. The respective opposite ends of the radially directed tear seams are connected to respective straight or modestly curved tear seams 148a. Each of these tear seams 148a can be oriented generally horizontally or vertically. As the air bag fills with inflation gas, the lip 147 is pulled out of the groove 55 and the cover tears along each tear seam 148, which permits each sector or segment 144a of the cover to move or pedal outwardly, permitting the air bag to exit about the open annular spacing between the now opened cover and the center module.

Figure 17:
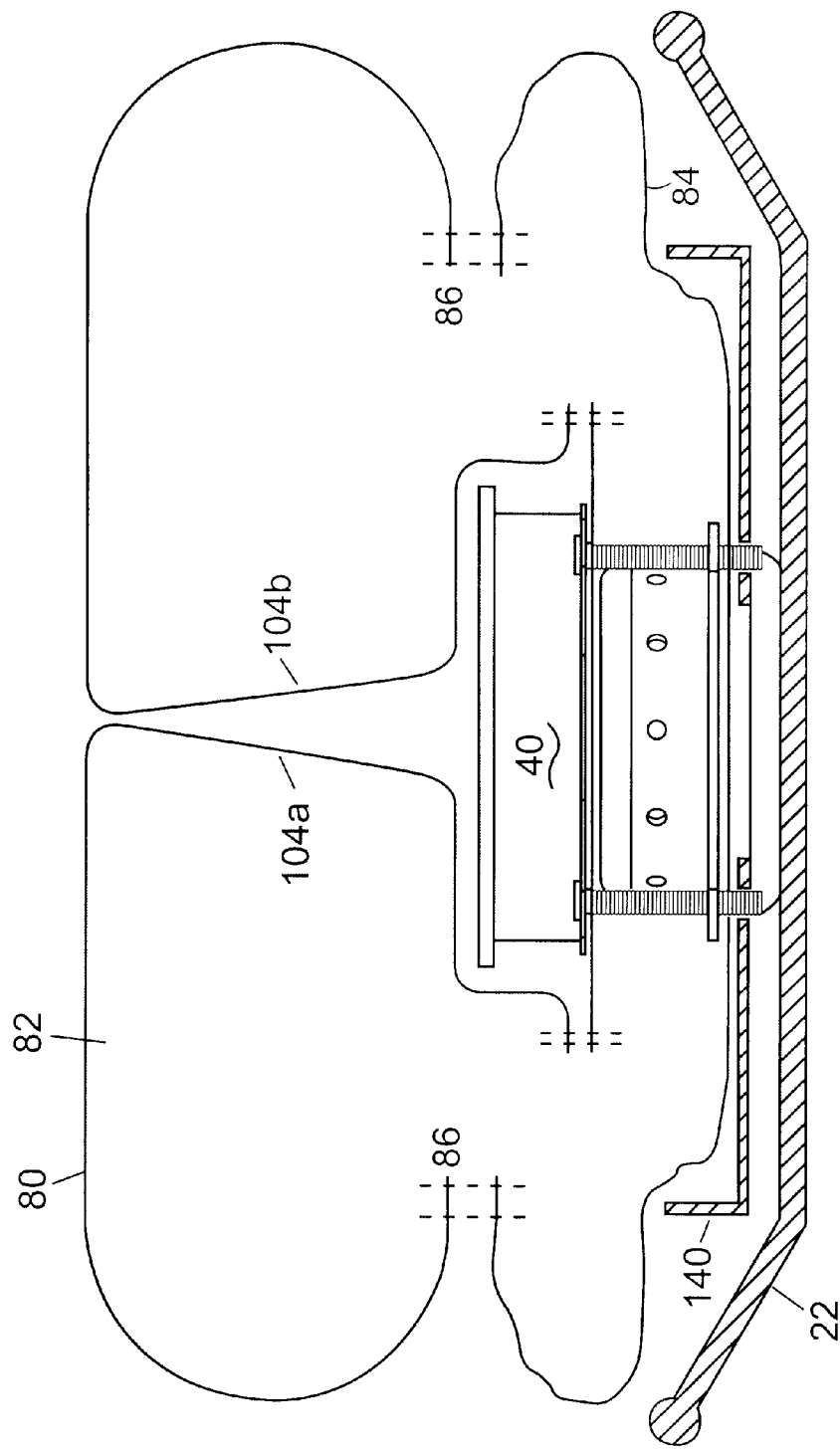
FIG. 17 is a cross-sectional view showing the air bag inflated.

Reference is briefly made to FIG. 17, which shows the air bag 80 in its inflated condition. As can be seen, the face and rear bag panels form an annulus centered about the center module. As the air bag inflates, the pressure internal to the bag acts on the walls of tubular element or portion 110, 110a, 110b, urging the sides 92a,b of the slit or opening 92 closed. An inflated air bag is also shown in FIG. 12b. The air bags of FIGS. 17 and 12b are the same but the housings and cover vary. Further, the view of FIG. 12b is 90 degrees from the view of FIG. 17.

Reference is briefly made to FIG. 12. In this embodiment the center module 40 includes a flange 55a, which replaces groove 55. Additionally, the cover 140 includes a recessed flange 55b, which fits beneath the flange 55a.

Many changes and modifications in the above-described embodiment of the invention can, of course, be carried out without departing from the scope thereof. Accordingly, that scope is intended to be limited only by the scope of the appended claims.

What is claimed is:

1. An air bag module, comprising an air bag, the air bag including:
   a face panel having a narrowly shaped first opening therein;
   a rear panel of substantially the same size as the first panel and having a central opening;
   a tubular member having an open end and an opposite closed end, the open end secured to the face panel along the first opening and wherein the interior of the tubular member is accessible through the first opening.

2. The air bag module as defined in claim 1 wherein the first opening is a narrow slit.

3. The air bag module as defined in claim 1 wherein the first opening is oval in shape.

4. The air bag module as defined in claim 1 wherein the first opening is one of oblong and rectangular in shape.

5. An air bag module, comprising an air bag, the air bag including:
   a face panel having a first opening therein;
   a rear panel of substantially the same size as the first panel and having a central opening;
   a tubular member having an open-end and an opposite closed end, the open end secured to the face panel along the first opening and wherein the interior of the tubular member is accessible through a slit;
   wherein the first opening is of sufficient size to permit receipt of a center module through the first opening.

6. The air bag module as defined in claim 5 wherein the slit through which the interior of the tubular member is accessible is the first opening in the face panel.

7. An air bag module, comprising an air bag, the air bag including:
   a face panel having a first opening therein;
   a rear panel having a central opening;
   a tubular member having an open end, the open end secured to the face panel along the first opening and wherein the interior of the tubular member is accessible through a slit: and
   wherein the tubular member includes a bottom and wherein the bottom of the tubular member is locatable between the bottom of a center module and a portion of an inflator.

8. The air bag module as defined in claim 7 wherein the bottom of the tubular member is sandwiched between the center module and the top of the inflator.

9. The air bag module as defined in claim 8 wherein the air bag in a folded state is located about sides of the center module and covered by a cover.

10. The air bag module as defined in claim 7 wherein the inflator does not protrude out from the air bag.

11. An air bag module comprising:
an air bag that is initially folded and when inflated expands to an annular configuration, the air bag having a center tubular member, wherein internal pressure of the air bag acts to collapse the tubular member, providing an inflatable barrier effectively closing a previously open end of the tubular member; wherein the center tubular member includes opposing sets of wall portions wherein the length of the wall portion for a first set has a first dimension and wherein the length of the wall portion for a second set has a second, different dimension and a cover to protectively cover the air bag.

12. The air bag module as defined in claim 11 including a control module adapted to be received within the tubular member and positioned there so that the inflated air bag is positioned annularly about the control module.

13. The air bag module as defined in claim 11 wherein the cover includes a plurality of tear seams on a top of the cover.

14. The air bag module as defined in claim 13 wherein the first opening is a slit.

15. The air bag module as defined in claim 11 wherein the cover includes an additional circumferential tear seam located generally about the periphery of the control module.

16. The air bag module as defined in claim 11 wherein the center tubular member is configured as a flexible core panel with a scalloped top which traverses opposing sets of dissimilarly dimensioned wall portions.

17. An air bag module, comprising an air bag, the air bag including:
a face panel having a centrally located slit therein;
a rear panel of substantially the same size as the first panel and having a central opening;
a tubular member having an open end and an opposite closed end, the open end secured to the face panel along the slit and wherein the interior of the tubular member is accessible through the slit.

18. The air bag module as defined in claim 17 wherein the face panel is circular.

19. The air bag module as defined in claim 17 wherein the tubular portion includes a flexible core panel with a scalloped top.

20. The air bag module as defined in claim 19 wherein the scalloped top is one of concave and convex.

21. The air bag module as defined in claim 17 wherein the tubular portion is of a one-piece woven construction.

22. An air bag module, comprising an air bag, the air bag including:
a face panel having a first opening therein, wherein first diameter of the first opening is smaller than that of a second diameter;
a rear panel of substantially the same size as the first panel and having a central opening;
a tubular member having an open end and an opposite closed end, the open end secured to the face panel along the first opening and wherein the interior of the tubular member is accessible through the first opening.

* * * * *